US008805133B1

(12) United States Patent
Rhonehouse et al.

(10) Patent No.: US 8,805,133 B1
(45) Date of Patent: Aug. 12, 2014

(54) LOW-LOSS UV TO MID IR OPTICAL TELLURIUM OXIDE GLASS AND FIBER FOR LINEAR, NON-LINEAR AND ACTIVE DEVICES

(71) Applicant: NP Photonics, Inc., Tucson, AZ (US)

(72) Inventors: Daniel Larry Rhonehouse, Tucson, AZ (US); Arturo Chavez-Pirson, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 38 days.

(21) Appl. No.: 13/745,028

(22) Filed: Jan. 18, 2013

(51) Int. Cl.
*G02B 6/00* (2006.01)
*C03B 37/023* (2006.01)
*C03C 3/12* (2006.01)
*D02G 3/00* (2006.01)
*C03C 13/04* (2006.01)
*C03C 3/253* (2006.01)
*C03C 3/23* (2006.01)
*C03C 4/00* (2006.01)

(52) U.S. Cl.
CPC .............. *C03C 13/048* (2013.01); *C03C 3/122* (2013.01); *C03C 3/253* (2013.01); *C03C 3/23* (2013.01); *C03C 4/0071* (2013.01)
USPC .............. 385/14; 385/122; 385/123; 385/141; 385/142; 385/143; 385/145; 65/376; 65/378; 65/385; 65/388; 65/389; 65/390; 501/41; 501/42; 428/375

(58) Field of Classification Search
CPC ...... C03C 13/048; C03C 3/122; C03C 3/253; C03C 3/23; C03C 4/0071; C03C 13/04; C03C 13/042; C03C 13/043; C03C 13/046; C03C 25/107; C03C 3/062; C03C 3/07; C03C 3/14; C03C 4/10; C03B 2201/78; C03B 2203/12; C03B 2203/14; C03B 2203/16; C03B 2203/42; C03B 2205/10; C03B 37/02781; G02B 6/02328; G02B 6/02347

USPC ............ 385/122–123, 141–145; 65/376, 378, 65/385, 388–390; 501/41–42; 428/375
See application file for complete search history.

(56) References Cited

U.S. PATENT DOCUMENTS 3,883,357 A  5/1975  Cooley
5,093,288 A  3/1992  Aitken et al.
(Continued)

FOREIGN PATENT DOCUMENTS

DE   3125299 A1 *  5/1982 ................ C03C 3/30
GB   2378700 A  *  2/2003 ................ C03C 3/12

OTHER PUBLICATIONS

Chalcogenide Glasses for Optical and Photonics Applications; D. Lezal et al Journal of Optoelectronics and Advanced Materials vol. 6, No. 1, Mar. 2004, p. 133-137.*
Chalcogenide Glass Optical Waveguides for Infrared Biosensing, Marie-Laure Anne et al; www.mdpi.com/journal/sensors Sensors 2009, 9, 7398-7411.*

(Continued)

*Primary Examiner* — Charlie Peng
*Assistant Examiner* — Guy Anderson
(74) *Attorney, Agent, or Firm* — Eric A. Gifford (57) ABSTRACT

A tellurium oxide glass that is stable, strong and chemically durable exhibits low optical loss from the UV band well into the MIR band. Unwanted absorption mechanisms in the MIR band are removed or reduced so that the glass formulation exhibits optical performance as close as possible to the theoretical limit of a tellurium oxide glass. The glass formulation only includes glass constituents that provide the intermediate, modifiers and any halides (for OH— reduction) whose inherent absorption wavelength is longer than that of Tellurium (IV) oxide. The glass formulation is substantially free of Sodium Oxide and any other passive glass constituent including hydroxyl whose inherent absorption wavelength is shorter than that of Tellurium (IV) oxide. The glass formulation preferably includes only a small residual amount of halide.

22 Claims, 8 Drawing Sheets

| Batch Constituent | Phonon Energy Peak (cm-1) | Fundamental Absorption Wavelength (microns) | 2nd Phonon (microns) | 3rd Phonon (microns) | 4th Phonon (microns) | 5th Phonon (microns) |
|---|---|---|---|---|---|---|
| $B_2O_3$ | 1400 | 7.1 | 3.6 | 2.4 | 1.8 | 1.43 |
| $P_2O_5$ | 1200 | 8.3 | 4.2 | 2.8 | 2.1 | 1.67 |
| $SiO_2$ | 1100 | 9.1 | 4.5 | 3.0 | 2.3 | 1.82 |
| $WO_3$ | 925 | 10.8 | 5.4 | 3.6 | 2.7 | 2.16 |
| $GeO_2$ | 900 | 11.1 | 5.6 | 3.7 | 2.8 | 2.22 |
| $Nb_2O_5$ | 860 | 11.6 | 5.8 | 3.9 | 2.9 | 2.33 |
| $TeO_2$ | 650 | 15.4 | 7.7 | 5.1 | 3.8 | 3.08 |
| Fluoride | 600 | 16.7 | 8.3 | 5.6 | 4.2 | 3.33 |
| $La_2O_3$ | 450 | 22.2 | 11.1 | 7.4 | 5.6 | 4.44 |
| ZnO | 235 | 42.6 | 21.3 | 14.2 | 10.6 | 8.51 |
| BaO | 200 | 50.0 | 25.0 | 16.7 | 12.5 | 10.00 |
| PbO | 180 | 55.6 | 27.8 | 18.5 | 13.9 | 11.11 |

(56) References Cited

U.S. PATENT DOCUMENTS

| | | | |
|---|---|---|---|
| 5,305,414 A | | 4/1994 | Higby et al. |
| 5,364,434 A | * | 11/1994 | Sanghera et al. ............... 65/30.1 |
| 5,796,903 A | | 8/1998 | Tran |
| 6,194,334 B1 | | 2/2001 | Aitken et al. |
| 6,529,675 B1 | * | 3/2003 | Hayden et al. ................. 385/141 |
| 6,656,859 B2 | * | 12/2003 | Aitken et al. ................... 501/41 |
| 6,760,526 B2 | * | 7/2004 | Ellison et al. ................. 385/123 |
| 6,841,792 B2 | * | 1/2005 | Bynum et al. ................. 250/556 |
| 6,898,359 B2 | * | 5/2005 | Soljacic et al. ............... 385/123 |
| 7,016,593 B2 | * | 3/2006 | Hewak et al. ................. 385/141 |
| 7,033,966 B2 | * | 4/2006 | Kobayashi et al. ............. 501/41 |
| 7,142,756 B2 | * | 11/2006 | Anderson et al. ............. 385/125 |
| 7,285,509 B2 | | 10/2007 | Bayya et al. |
| 7,519,253 B2 | * | 4/2009 | Islam ............................ 385/122 |
| 7,873,251 B2 | | 1/2011 | Bayya et al. |
| 8,055,108 B2 | * | 11/2011 | Islam ............................ 385/122 |
| 8,120,778 B2 | * | 2/2012 | Fermann et al. ............. 356/477 |
| 8,159,742 B2 | * | 4/2012 | Dong et al. .................. 359/341.1 |
| 8,237,122 B2 | * | 8/2012 | Fermann et al. ........... 250/341.1 |
| 8,624,215 B2 | * | 1/2014 | Hewak et al. ..................... 257/3 |
| 2003/0045421 A1 | * | 3/2003 | Burger et al. ................... 501/41 |
| 2003/0049003 A1 | * | 3/2003 | Ahmad et al. ................ 385/123 |
| 2006/0104582 A1 | * | 5/2006 | Frampton et al. ............. 385/123 |
| 2007/0181867 A1 | * | 8/2007 | Hewak et al. ...................... 257/4 |
| 2008/0039309 A1 | * | 2/2008 | Wolff et al. ...................... 501/46 |
| 2010/0108886 A1 | * | 5/2010 | Shaw et al. ............. 250/339.08 |
| 2011/0274924 A1 | | 11/2011 | Jiang et al. |
| 2012/0205352 A1 | * | 8/2012 | Fermann ................... 219/121.67 |
| 2012/0236314 A1 | * | 9/2012 | Fermann et al. ............. 356/479 |
| 2012/0261345 A1 | * | 10/2012 | Hassler et al. ................ 210/669 |
| 2012/0327959 A1 | * | 12/2012 | Fermann et al. .................. 372/6 |
| 2013/0188240 A1 | * | 7/2013 | Shaw et al. ................... 359/326 |
| 2014/0076404 A1 | * | 3/2014 | Tan et al. ...................... 136/263 |

OTHER PUBLICATIONS

O'Donnell et al., "Fluorotellurite glasses with improved mid-infared transmission," Journal of Non-Crystalline Solids 331 (2003) 48-57.

Zorin et al., "Microinhomogeneities in Tellurite Glasses," Inorganic Materials, vol. 41, No. 7, 2005, pp. 775-778. Translated from Neorganicheskie Materialy, vol. 41, No. 7, 2005, pp. 881-885.

Eroni et al., "Evaluation of the third-order nonlinear optical properties of tellurite glasses by thermally managed eclipse Z-scan," Journal of Applied Physics 105, 024512 (2009).

CorActive Specialty Optical Fiber Manufacturer Infrared Fiber Products, Product Description, Copyright © 2010-2011 CorActive High-Tech Inc.

Massera et al., "Processing of Tellurite-Based Glass with Low OH Content," J. Am. Ceram. Soc., 1-7 (2010).

Li et al., "Energy transfer and 1.8m emission in $Tm^{3+}/Yb^{3+}$ codoped lanthanum tungsten tellurite glasses," Journal of Alloys and Compounds 504 (2010) 573-578.

Ebendorff-Heidepriem et al., "Extruded tellurite glass and fibers with low OH content for mid-infrared applications," Optical Materials Express, vol. 2, Issue 4. pp. 432-442 (2012) http://dx.doi.org/10.1364/OME.2.000432.

El-Mallawany et al., "Volume and thermal studies for tellurite glasses," J Mater Sci (2010) 45:871-987.

Liao et al., "Preparation and characterization of new fluorotellurite glasses for photonics application," Journal of Non-Crystalline Solids 355 (2009) 447-452.

Feng et al., "Tungsten-tellurite glass a new candidate medium for $Yb^{3+}$ doping," Journal of Non-Crystalline Solids 256&257 (1999) 372-377.

Chavez-Pirson et al., "Tellurite Glass and Fiber Development for Mid-IR Transport and Supercontinuum Applications," Photonics Society Summer Topical Meeting Series, 2011, IEEE, p. 91.

\* cited by examiner

| Batch Constituent | Phonon Energy Peak | Fundamental Absorption Wavelength | 2nd Phonon | 3rd Phonon | 4th Phonon | 5th Phonon |
|---|---|---|---|---|---|---|
| | (cm-1) | (microns) | (microns) | (microns) | (microns) | (microns) |
| $B_2O_3$ | 1400 | 7.1 | 3.6 | 2.4 | 1.8 | 1.43 |
| $P_2O_5$ | 1200 | 8.3 | 4.2 | 2.8 | 2.1 | 1.67 |
| $SiO_2$ | 1100 | 9.1 | 4.5 | 3.0 | 2.3 | 1.82 |
| $WO_3$ | 925 | 10.8 | 5.4 | 3.6 | 2.7 | 2.16 |
| $GeO_2$ | 900 | 11.1 | 5.6 | 3.7 | 2.8 | 2.22 |
| $Nb_2O_5$ | 860 | 11.6 | 5.8 | 3.9 | 2.9 | 2.33 |
| $TeO_2$ | 650 | 15.4 | 7.7 | 5.1 | 3.8 | 3.08 |
| Fluoride | 600 | 16.7 | 8.3 | 5.6 | 4.2 | 3.33 |
| $La_2O_3$ | 450 | 22.2 | 11.1 | 7.4 | 5.6 | 4.44 |
| ZnO | 235 | 42.6 | 21.3 | 14.2 | 10.6 | 8.51 |
| BaO | 200 | 50.0 | 25.0 | 16.7 | 12.5 | 10.00 |
| PbO | 180 | 55.6 | 27.8 | 18.5 | 13.9 | 11.11 |

LOW-LOSS UV TO MID IR OPTICAL TELLURIUM OXIDE GLASS AND FIBER FOR LINEAR, NON-LINEAR AND ACTIVE DEVICES

GOVERNMENT RIGHTS

This invention was made with United States Government support under Contract Number N68335-11-C-0035 with the Naval Air Warfare Center AD (LKE). The United States Government has certain rights in this invention.

BACKGROUND OF THE INVENTION

1. Field of the Invention

This invention relates to optical tellurium oxide glasses and fibers for Mid Infrared (MIR) devices, and more particularly to a tellurium oxide glass composition that improves optical performance in the MIR band without sacrificing stability, strength or chemical durability.

2. Description of the Related Art

Glass and glass optical fiber have become critically important engineering materials over the last half century. Glassy materials are generally capable of transmitting light in one or more of several wavelength "bands" loosely defined as Ultraviolet (UV) from 0.01-0.39 microns, Visible (Vis) from 0.39-0.750 microns, Near Infrared (NIR) from 0.750-2.0 microns, Mid Infrared (MIR) from 2.0-5.0 microns, and Long Wave IR>>5.0 microns. The glasses and optical fibers are used in many applications including but not limited to communications, spectroscopy, chemical sensing, medical applications, generating and/or guiding laser light and other optical sources.

Generally speaking, the glasses and optical fibers may be used in linear, non-linear and active devices. In linear devices, light is transmitted without changing the properties of the light. Typical linear devices include light guiding structures such as transport fiber, single and multimode fibers and waveguides. In non-linear devices, the optical output is a nonlinear function of the intensity of the light, often resulting in creation of frequencies not present in the input. Typical non-linear devices include Raman lasers and amplifiers, optical switches and supercontinuum sources. In active devices, the glass includes an active dopant that provides optical gain. For each pump photon absorbed, the dopant re-emits multiple photons. Typical active devices include lasers and amplifiers.

To be useful, a glass must exhibit low optical losses, typically measured in dB/m, for the band or bands of interest. Absorption at wavelengths within the band produces optical loss. Furthermore, the glass and glass optical fiber must be strong, chemically durable and stable (i.e. not prone to crystallization).

In the 1970's silica glass and fiber was developed. Silica based optical fiber became the material of choice for long haul data transmission due to exceptional low loss in the so-called telecom window near 1.5 micron wavelength. Silica fiber however is limited by inherent absorption of the silica glass at wavelengths longer than about 2.3 microns.

U.S. Pat. No. 3,883,357 to Cooley proposed a laser glass composition comprising Tellurium (IV) Oxide $TeO_2$, Lanthanum Oxide $La_2O_3$; and Zinc Oxide ZnO and an effective lasing amount of $Nd_2O_3$ for stimulated emission at a wavelength of about 1.06 microns. As stated at col. 3, lines 29-53, this glass exhibited unexpectedly high fluorescent activity at 1.06 microns and thus the potential for enhanced gain compared to silica glass. These and other Zinc Tellurite glasses did not capture a large market due to the very mature low-cost process for making high quality silica based fiber with exceptionally low loss.

In the 1990's and early 2000's tellurite glass again gained favor as the need for telecom amplifiers drove research into erbium doped tellurite lasers operating at 1.5 microns (U.S. Pat. Nos. 5,251,062; 6,266,191; 6,413,891). Tellurite glass possesses broad glass forming regions and excellent rare earth solubility as compared to silica to support higher dopant concentrations. Over the next decade these active devices moved to slightly longer wavelengths up to 2 microns by incorporating Thulium and Holmium dopants thus covering the NIR wavelength range. These glasses often suffered due to losses caused by water (hydroxyl OH—) incorporated into the glass during melting which quenches gain by these active NIR dopants.

Researchers continue to search for glasses and optical glass fiber that exhibit low loss well into the MIR band and possess the requisite glass transition temperature Tg, stability, strength and durability. MIR glass has been developed in several distinct families including halide, chalcogenide, and oxide types.

Of the possible halides including fluorine, chlorine, bromine and iodine, only fluoride-based glasses have gained some commercial use due to a severe lack of chemical durability and potential toxicity of chlorides, bromides and iodides. Fluoride glass exhibits good transmission characteristics to greater than 5 microns but has not gained widespread acceptance due to low chemical durability, low physical strength, difficulty in achieving low loss fusion splices, low melting temperatures that make them not suitable for coating with anti reflective coatings by common vapor phase methods and difficulty in routinely producing very long lengths without defects. The inherent low melting temperatures of fluoride glasses also limit laser damage thresholds and maximum average power handling capability.

Chalcogenide glass based on the elements Sulfur, Selenium and Tellurium has good transmission from the near infrared to long infrared region but does not transmit in the visible. These glasses do not contain oxygen but are made up of inter-metallic structures such as $As_2S_3$, $As_2Se_3$, $GeS_2$, $GeSe_2$, etc. . . . . Chalcogenides also have distinct absorption peaks in the MIR region. Chalcogenides are physically extremely weak leading to fiber breakage during manufacturing of cables as well as in use in high vibration environments. Chalcogenides possess very low melting temperatures making them not suitable for common vapor phase coating processes.

Oxide glasses based on Tellurium can theoretically transmit light with low loss to beyond 5 microns. The optical losses into the MIR are inherently higher with tellurium oxide than with either the halides or chalcogenides because of its higher phonon energy. However, known formulations of oxide glasses for NIR applications possess the required stability, strength and chemical durability lacking in the halide and chalcogenide glasses. These formulations have typically relied on the incorporation of Lead (Pb), Germanium (Ge), Tungsten (W), Niobium (Nb) and Sodium (Na) as well as various others atomic species to overcome the tendency towards crystallization. Lead being toxic is avoided when possible.

To improve optical performance of these Tellurium oxide glasses into the MIR band, researchers have directed their efforts to developing glass formulations and processing that reduce the amount of hydroxyl (OH—) that is entrapped in the glass during melting.

U.S. Patent Pub. No. 2003/0045421 to Berger describes an optical tellurite glass for waveguide amplifiers and oscillators comprising $TeO_2$, ZnO, PbO, $Nb_2O_5$, $La_2O_3$ and/or other rare earth oxides (dopants) and metal halides that have good melting and processing properties and a high crystallization stability and a low water content. In [0031] Berger claims a "surprisingly low OH-group absorption of the glasses of less than 3.5 dB/cm at 3,200 nm."

Liao et. al. "Preparation and characterization of new fluorotellurite glasses for photonics application", Journal of Non-Crystalline Solids 355 (2009) 447-452 fabricated new glasses based on $TeO_2$—$ZnF_2$—PbO—$Nb_2O_5$ for mid-infrared lasers. The addition of $ZnF_2$ changed significantly the glass optical properties. In particular, the absorption loss in the visible and infrared regions of the fluoro-tellurite glasses (e.g. 10 mol % $ZnF_2$) was much reduced compared with that of the tellurite glass, which was because the hydroxide (OH) groups decreased markedly.

Jonathan Massera et al. "Processing of Tellurite-Based Glass with Low OH Content" J. Am. Ceram. Soc. 1-7, 2010 reported on the processing and characterization of tellurite-based glass in the $TeO_2$—$Bi_2O_3$—ZnO (TBZ) glass family and specifically on efforts to reduce their absorption loss due to residual (OH) content. Massera replaced the 20 mol % ZnO of the control glass with 20 mol % $ZnF_2$ and added a fluorinating agent NH4F—HF to reduce hydroxyl. After melt, the final glass composition includes greater than 7 mol % of Zinc Fluoride. Massera also was able to reduce hydroxyl content by performing the melt in an oxygen rich atmosphere.

Heike Ebendorff-Heidepriem et al. "Extruded tellurite glass and fibers with low OH content for mid-infrared applications" Optical Materials Express, Vol. 2, Issue 4, pp. 432-442 (2012) reports a fluoride-free process using a dry atmosphere for the glass melt that enables the absorption at the OH peak at 3.3 microns to be reduced by more than an order of magnitude compared with glasses melted in open air. They reported an OH absorption peak of 40-50 dB/m at 3.3 microns for a fluoride-free glass composition of 73 $T_3O_2$-20 ZnO-5 $Na_2O$-2 $La_2O$ (in mole %).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a tellurium oxide glass having low optical loss from the UV band well into the MIR band that is stable, strong and chemically durable.

This is accomplished by removing or reducing unwanted absorption mechanisms in the MIR band so that the glass formulation exhibits optical performance as close as possible to the theoretical limit of a tellurium oxide glass while simultaneously providing glass stability, strength and chemical durability. The glass formulation only includes glass constituents that provide the intermediate, modifiers and any halides (for OH— reduction) whose inherent absorption wavelength is longer than that of Tellurium (IV) oxide. The glass formulation is substantially free of Sodium Oxide and any other passive glass constituent including hydroxyl whose inherent absorption wavelength is shorter than that of Tellurium (IV) oxide. The glass formulation preferably includes only a small residual amount of halide. The pre-melt glass formulation suitably includes only a sufficient amount of halide to react with and carry away the hydroxyl during the melt. A non-zero residual amount of halide in the glass indicates that substantially all of the hydroxyl is removed. A small residual amount does not degrade the chemical durability of the glass nor does it lead to breakage of tellurium oxygen bonds that would increase absorption in the MIR band and weaken the glass.

In an embodiment, an oxide glass composition comprises a glass network former of Tellurium (IV) oxide $TeO_2$ of 65 to 90 mole percent. Tellurium (IV) oxide has an absorption feature with an inherent absorption wavelength corresponding to its phonon energy peak. The glass composition also includes a glass intermediate of Lanthanum (III) oxide $La_2O_3$ of 0.2 to 15 mole percent, a glass modifier MO of 0.2 to 35 mole percent where M is selected from Mg, Ca, Sr, Ba, Zn, Pb and Cd and a halide of 0 to 5 percent. Each of the Lanthanum (III) oxide, modifier and halide has an absorption feature with an inherent absorption wavelength longer than that of Tellurim (IV) oxide. The oxide glass composition is substantially free, wherein substantially free is less than 0.1 mole percent, of Sodium Oxide Na.sub2.O; Hydroxide OH—; and any other passive glass constituent having an absorption feature with an inherent absorption wavelength shorter than that of Tellurium (IV) oxide. The oxide glass may be a passive glass free of any active dopants or may be an active glass including active dopants selected from Er, Ho, Tm, Dy, Sm, Fe and Cr for stimulated emission at a wavelength between 2 microns to 4.5 microns. Alternately, active dopants selected from Ce, Pr, Eu, Tb, Lu, Bi, Ti, Er and Yb may be used for stimulated emission at wavelengths less than 2 microns. The oxide glass exhibits solubility to support high concentrations of active dopants up to and exceeding 5 mol %.

In an embodiment, the oxide glass comprises a non-zero amount of the halide at a concentration of less than 5 mol %, suitably less than 1 mol % and preferably less than 0.5 mol %.

In an embodiment, the oxide glass has an optical loss of less than 2 dB/m over the entire spectral range from 0.6 microns to 4.5 microns. The glass exhibits an optical loss of less than 0.5 dB/m over a spectral sub-band from 0.65 to 4.2 microns. The glass exhibits an optical loss of less than 0.3 dB/m over a sub-band from 2 microns to 4 microns including an optical loss of less than 0.3 dB/m due to OH— at approximately 3 microns corresponding to the peak absorption of OH—.

In an embodiment, the oxide glass is in the form of an optical fiber. In an embodiment, the optical fiber is used as a passive transport fiber for multiple optical sources including at least a MIR source. In an embodiment, the optical fiber is used as the gain media for a MIR laser. In another embodiment, the optical fiber is used in a Raman amplifier/laser or a Supercontinuum source.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a tellurium oxide glass having low optical loss from the UV band well into the MIR band that is stable, strong and chemically durable. The tellurium oxide glass provides a base glass formulation for use in linear, non-linear and active devices as a bulk glass or fiber in the UV, Visible and MIR bands.

To achieve optical loss performance as close as possible to the theoretical limit of tellurium oxide glass all of the unwanted absorption mechanisms, particularly those in the MIR band, must be either removed or substantially reduced without compromising glass stability, strength and chemical durability. The proper formulation of the tellurium oxide glass concerns both what glass constituents are included and what glass constituents are excluded or minimized.

To review, the known tellurium oxide glass formulations for MIR used standard tellurite glass compositions with proven stability, strength and chemical durability and modified the composition and melt in an attempt to reduce hydroxyl (OH—) content.

Burger reported an absorption loss of less than 3.5 dB/cm (350 dB/m) at 3,200 nm, which he described as a "surprisingly low OH-group absorption". Burger's glass included 0.5-12 mol % $Nb_2O_5$ which has an inherent absorption wavelength shorter than that of Tellurium (IV) oxide. Burger's glass also includes lead oxide PbO.

Figure 3:
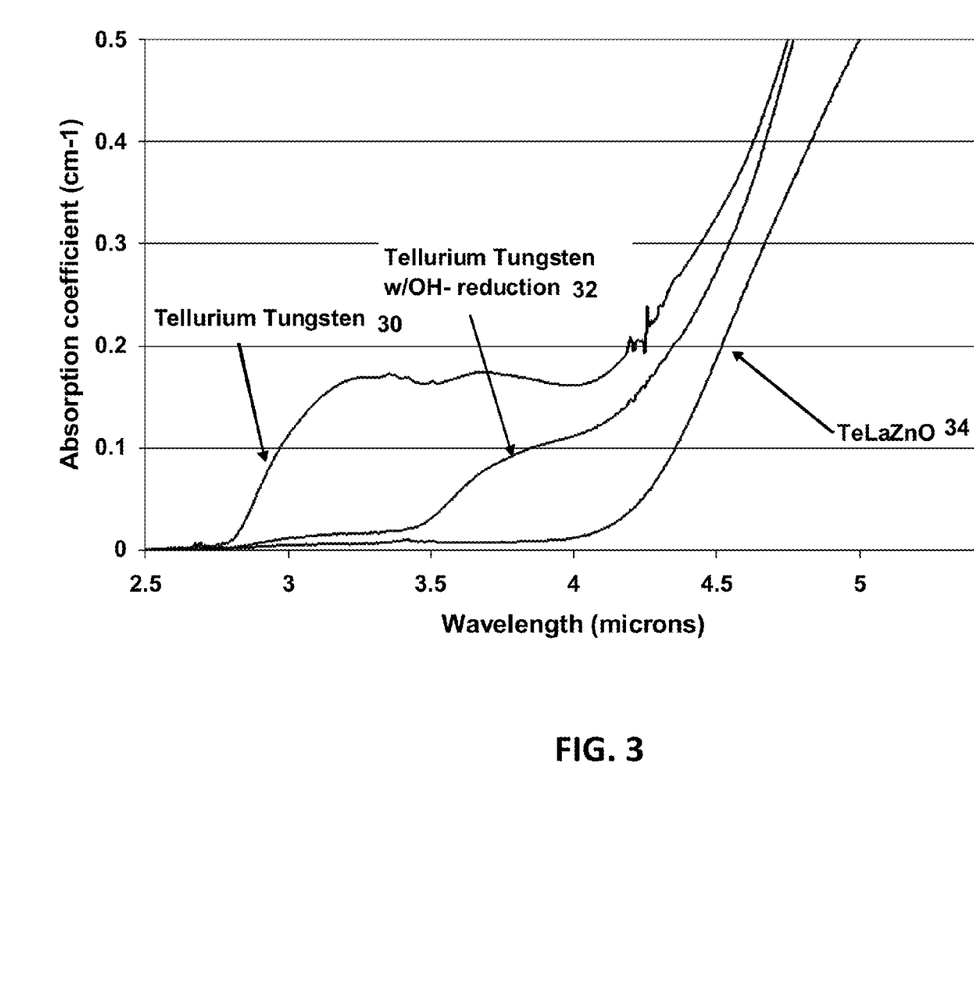
FIG. 3 is a plot of absorption coefficient versus wavelength for different tellurium oxide glasses.

Liao's glass also included $Nb_2O_5$. Liao used 10 mol % $ZnF_2$ to reduce the hydroxide (OH) groups. As shown in FIG. 3, Liao's glass has a minimum absorption at approximately 2 microns and exhibits absorption features between 2.7 and 3.5 microns. The wavelength corresponding to the theoretical minimum absorption of tellurium oxide glass occurs at approximately 3 microns. It is clear that Liao has not substantially eliminated the residual OH and it is likely that the high concentration of $ZnF_2$ has created absorption features by breaking the tellurium oxide bonds creating non-bridging oxygen. The high residual concentration of $ZnF_2$ may also weaken the glass and degrade its chemical durability. Liao's glass also includes lead oxide PbO.

Massera uses a very high concentration of $ZnF_2$, 20 mol %, to reduce hydroxyl. As shown in FIG. 3a, melting the TBZ glass having 20 mol % $ZnF_2$ substituted for the ZnO in an oxygen environment after pretreatment with a fluorinating agent 32 did significantly lower the absorption coefficient as compared to the base TBZ glass 30. This glass has a minimum absorption at approximately 2.5 microns but exhibits absorption features between 2.5 microns and 3.5 microns. Again, the high concentration of $ZnF_2$ may also weaken the glass and degrade its chemical durability by breaking the tellurium oxide bonds creating non-bridging oxygen.

Ebendorff-Heidepriem uses a "fluoride-free" process for the glass melt. However, Ebendorff's glasses contain alkali metal in particular sodium, which is a network modifier in glass. Adding sodium depolymerizes the glass network by breaking bridging tellurium-oxygen-tellurium bonds. In doing so, a larger proportion of $TeO_3$ units occur which leads to an increase in non-bridging oxygen sites and an increase in absorption at the longer range of tellurium-oxygen phonon energy at 740 $cm^{-1}$ versus the peak near 650 $cm^{-1}$ for $TeO_4$ units and a large decrease in Tg values. This increase at 740 $cm^{-1}$ will be reflected in an increase in absorption at the short wavelength IR edge for the glass. This is to be avoided as much as possible in order that a fiber retains maximum transmission capability for MIR wavelengths. Additionally hydrogen ions can then associate with these non-bridging oxygen ions forming hydroxyl groups giving rise to unwanted absorption at the fundamental hydroxyl absorption peak at approximately 3 microns.

The reported results clearly demonstrate that although progress has been made in reducing OH— and improving optical losses into the MIR band the present tellurium oxide glass formulations and melting methods do not provide performance close to the theoretical limit of a tellurium oxide glass while simultaneously providing glass stability, strength and chemical durability.

Our work to improve the optical performance of tellurium oxide glass towards its theoretical limit without sacrificing stability, strength and chemical durability has revealed two fundamental principles. First, the oxide glass formulation should not include any passive glass constituents having an absorption feature with an inherent absorption wavelength shorter than that of Tellurium (IV) oxide. Even though the inherent absorption wavelength of Tellurium (IV) oxide lies at 15.4 microns, well above the 5 micron upper bound of the MIR band, it is important to exclude any passive glass constituents whose inherent absorption wavelength is lower than 15.4 microns. Our research has demonstrated that the higher order phonon energy terms for any glass constituent whose inherent absorption wavelength is less than that of Tellurium (IV) Oxide can introduce significant absorption features in the MIR band. This has shown to be important for both passive fibers in which the length extends to meters or tens of meters and active fibers to avoid concentration quenching. Consequently, the glass formulation uses glass constituents for the intermediate and modifier whose inherent absorption wavelength is longer than that of Tellurium (IV) Oxide. Second, optimum reduction of OH— is not achieved by using very high concentrations of halides (e.g. $ZnF_2$) during the melt that leave a large residual amount of halide (F) in the final glass composition. Such large concentrations can in fact promote the retention of moderate amounts of OH by breaking the tellurium oxide bonds creating more non-bridging oxygen and producing other unwanted absorbers in addition to the fact that high concentrations of Fluoride tend to weaken the glass and reduce its chemical durability.

Our glass formulation only includes glass constituents that provide the intermediate, modifiers and any halides (for OH— reduction) whose inherent absorption wavelength is longer than that of Tellurium (IV) oxide. The glass formulation is substantially free of Sodium Oxide and any other passive glass constituent including hydroxyl whose inherent absorption wavelength is shorter than that of Tellurium (IV) oxide. The glass formulation preferably includes only a small residual amount of halide. The pre-melt glass formulation suitably includes only a sufficient amount of halide to react with and carry away the hydroxyl during the melt. A non-zero residual amount of halide in the glass indicates that substantially all of the hydroxyl is removed. A small residual amount does not degrade the chemical durability of the glass nor does it lead to breakage of tellurium oxygen bonds that would increase absorption in the MIR band and weaken the glass.

Figure 1:
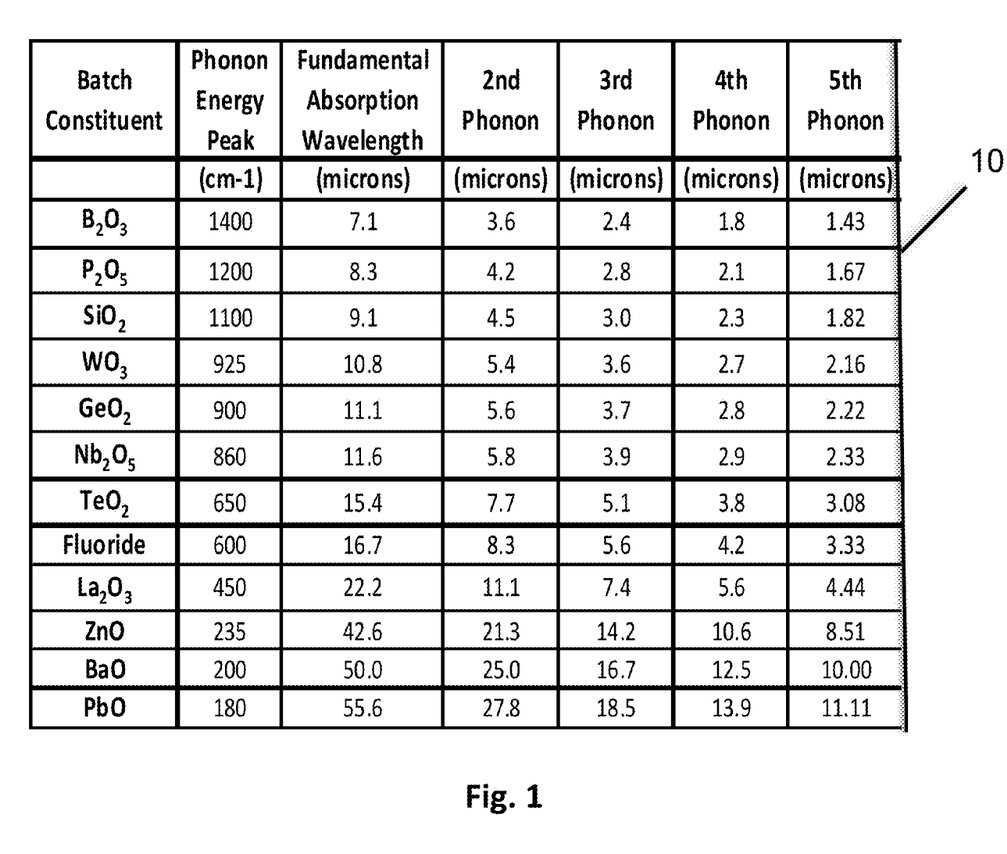
FIG. 1 is a table of phonon energies and absorption wavelengths for glass constituents.

FIG. 1 is a table 10 of the peak phonon energy, the corresponding inherent absorption wavelength and the absorption wavelengths corresponding to higher order phonon energies for a number of glass constituents including the common glass formers as well as certain second or third component materials commonly used in producing stable glass formulations. Tellurium (IV) oxide has a peak phonon energy of 650 $cm^{-1}$ and a corresponding inherent absorption wavelength of 15.4 microns. The glass constituents Germanium (Ge), Tungsten (W) and Niobium (Nb) that are commonly used in tellurite glass for MIR applications each have an inherent absorption wavelength lower than that of Tellurium (IV) oxide, hence they are not viable candidates for our oxide glass formulation. Sodium (Na) and Lead (Pb) do have absorption wavelengths above that of Tellurium (IV) oxide but are excluded for other reasons; Sodium inhibits the reduction of OH, severely lowers Tg and weakens the glass and Lead is toxic. In some cases lead may be used.

Our challenge was to find glass formers and other glass constituents to produce a stable, strong and chemically durable glass formulation using only materials whose inherent absorption wavelength is longer than that of Tellurium (IV) oxide.

Lanthanum oxide ($La_2O_3$) in glass can impart higher glass transition temperatures, strength, and durability. Lanthanum oxide is a glass intermediate only forming glass when combined with other constituents such as one of the common glass formers Silica dioxide ($SiO_2$), Phosphorus pentoxide ($P_2O_5$), Germanium dioxide ($GeO_2$) or Boron oxide ($B_2O_3$). Glasses containing lanthanum oxide however are known to be only moderately stable over a limited range of composition. Lanthanum oxide in glass is therefore generally limited to a role as a minor constituent comprising less than a few mole percentage of a given composition. Lanthanum oxide possesses very low phonon energy and even after four phonons only absorbs at wavelengths over 5 microns. Lanthanum oxide therefore possesses very desirable characteristics of high Tg, high corrosion resistance and low UV, Vis and MIR absorption.

To form fiber by the common rod-in-tube technique, a glass preform consisting of a core rod with a polished outer surface is placed inside a tube with polished inner and outer surface and heated to a temperature at which the glass rod and tube soften and fuse to be subsequently drawn or pulled to a fiber. A common benchmark for glass stability, $\Delta T$, is defined as the difference of the peak crystallization temperature Tx and glass transition temperature Tg or $\Delta T=Tx-Tg$ as determined by the common calorimetric technique Differential Scanning Calorimetry (DSC). In general a larger $\Delta T$ is desirable with a value greater than 100 C. often cited as reasonable for fiber drawing. Glasses containing only tellurium and lanthanum oxides have been made but exhibit very low values of $\Delta T$ in the range of 40 C. (Mallawany J. Mater. Sci. (2010) 45: 871-887).

Typically tungsten, niobium or germanium is used to form more stable compositions with a larger value of $\Delta T$. Again by careful analysis of Table 10 one realizes tungsten, niobium or germanium containing glasses all have phonon energies larger than $TeO_2$ and will produce unwanted absorptions within only as few as three multiples of the peak phonon energy. The third phonon edge is relevant for passive fibers meters to tens-of-meters in length or for much shorter active fibers. These materials must then be eliminated from any composition for which exceptionally low loss at wavelengths shorter than that of tellurium itself is desired.

Consequently other glass constituents must be found which can stabilize the Te—La glass compositions. Oxides formed from Magnesium (Mg), Calcium (Ca), Strontium (Sr), Barium (Ba), Zinc (Zn), Lead (Pb) and Cadmium (Cd) may be used to stabilize the Te—La glass composition. Each of these oxides has an inherent absorption wavelength above that of tellurium. These oxides in combination with tellurium and lanthanum oxides form a glass over an extended compositional region. Addition of these oxides to tellurium lanthanum glass compositions leads to increased $\Delta T$ values that are greater than 100 C. A preferred embodiment may use ZnO as it has been demonstrated to form highly stable TeLaZnO glass.

The glass formulation may include various other glass constituents for other glass forming purposes such as to overcome the tendency towards crystallization and to adjust other physical, thermal and optical properties such as Tg, thermal expansion coefficient, or refractive index. Any such constituent that is present in the finished glass in other than a de minimus amount must not have an absorption feature with an inherent absorption wavelength shorter than that of Tellurium (IV) oxide. For example, the base glass can be modified by the addition of other alkali, alkaline earth, transition metal, or heavy metal oxides or halides including Li, K, Rb, Cs, Mg, Ba, Ca, Sr, Y, Ti, Zr, Hf, Nb, Ta, Mo, Ga, In, Tl, Pb, As, Ge, Sb and Bi.

Additionally when doped with certain transition metals and/or rare earth metal oxides and/or halides singly or in combination, the described fiber is useful for laser light generation with greatly reduced concentration-quenching effects and enhanced efficiency. Possible dopants capable of supporting optical gain are Er, Ho, Tm, Dy, Sm, Fe and Cr for stimulated emission at a wavelength between 2 microns to 4.5 microns. Other dopants may be used either singly or in combination. Alternately, active dopants selected from Ce, Pr, Eu, Tb, Lu, Bi, Ti, Er, Yb may be used for stimulated emission at wavelengths less than 2 microns. Also, the dopant materials used in the MIR IR bands may also have emission lines less than 2 microns. Because the concentration-effects are greatly reduced, the dopant concentrations may be much higher than normal, up to and exceeding 2.5 wt % and 5 wt %.

Our next challenge was to provide a final glass formulation substantially free of hydroxyl (OH) without degrading the strength, stability and chemical durability of the glass and without creating new absorbers in the IR band. As with earlier techniques used by Liao and Massera, we introduce a halide, typically fluoride, into the glass composition that reacts with the hydroxyl during the melt to form volatile HF that is carried away in the furnace gas purge. Other halides such as Chloride, Bromide or Iodides may be used. The fluoride and chloride are typically introduced as a metal halide such as $ZnF_2$ or $PbF_2$.

However, unlike Liao and Massera who use large amounts of $ZnF_2$ in the initial glass leaving significant amounts of $F_2$ in the final glass, our preferred approach is to limit the initial fluoride content so that only a small non-zero residual amount of $F_2$ is present in the finished glass, typically less than 1 mol % and preferably less than 0.5 mol %. To ensure effective OH reduction, it is useful that the finished glass does contain a non-zero residual amount of $F_2$. Our research has shown that a large amount of $ZnF_2$ in the initial glass does not improve OH reduction. In fact, substantial residual fluorine content in the finished glass leads to a breakage of the tellurium oxygen bonds and increased absorption due to $TeO_{3+1}/TeO_3$ units. This breaking of bonds also weakens the glass structure leading to increased potential for corrosion and reduced physical strength. By limiting the initial fluoride content so that only a small residual amount of $F_2$ is present in the finished glass, the hydroxyl is removed without breaking the tellurium oxygen bonds or otherwise weakening the glass structure. Even absent efforts to minimize the residual $F_2$, the content is still at most 5 mol %, which is less than Liao and Massera.

Figure 2:
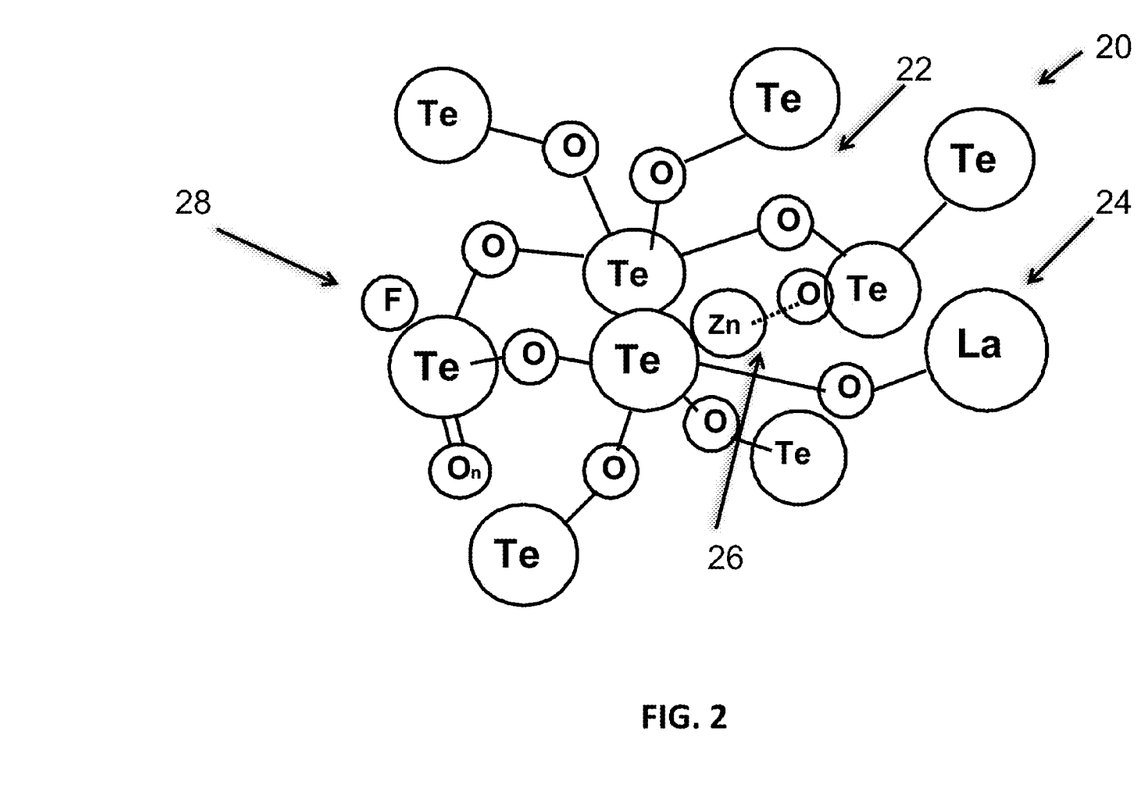
FIG. 2 is a diagram of a tellurium oxide glass composition in accordance with the present invention.

Referring now to FIG. 2, an embodiment of an oxide glass formulation 20 for a finished glass comprises:

a glass network former of Tellurium (IV) oxide $TeO_2$ 22 of 65 to 90 mole percent:

a glass intermediate of Lanthanum (III) oxide $La_2O_3$ 24 of 0.2 to 15 mole percent;

a glass modifier MO 26 of 0.2 to 35 mole percent where M is selected from Mg, Ca, Sr, Ba, Zn, Pb and Cd or combinations thereof;

and a halide 28 of 0 to 5 percent, wherein the oxide glass composition is substantially free of each of Sodium Oxide $Na_2O$, Hydroxide OH— and any other passive glass constituent having an absorption feature with an inherent absorption wavelength less than that of Tellurium (IV) oxide.

Once melted into a glass the various constituents become associated with other atoms in a complex way. So $TeO_2$ becomes a "chain" of Te atoms with four O atoms associated with it "$TeO_4$" groups or three oxygen "$TeO_3$" groups or something in between $TeO_{3+1}$ groups. Zinc fills in spaces between Te groups without becoming part of the "chain" and becomes only loosely associated with the oxygen or fluorine. Zn changes the shape of neighboring $TeO_4$ groups forming $TeO_{3+1}$ groups with a distorted electronic cloud. F or O from the Zn move to a position that compensates for the distorted electronic cloud to maintain electrical balance.

In an embodiment, the concentration of Lanthanum (III) oxide $La_2O_3$ 24 is 5-15 mole percent. In another embodiment, the concentration is 8-10%. In general, we have found that it is advantageous for the concentration of Lanthanum (III) oxide to be as high as possible consistent with forming a stable glass. Lanthanum (III) oxide increases the glass transition temperature and improves glass mechanical properties.

In an embodiment, the glass modifier MO 26 is ZnO. In an embodiment, the concentration of ZnO is a combination of ZnO provided in the initial glass pre-melt and ZnO that is formed by converting $ZnF_2$ or ZnCl during hydroxyl reduction. In an embodiment, the concentration of ZnO is at least 10 mole percent. Of the possible modifiers, ZnO has been found to produce the most stable glass with Lanthanum (III) oxide, which is particularly important for fiber drawing using the rod-in-tube technique.

In an embodiment, the halide 28 is present as a non-zero amount less than 1 mole percent, and preferably less than 0.5%. The presence of a non-zero amount of the halide ensures that the hydroxyl reduction process during the melt was not starved for a halide to react with the hydroxyl. A small amount of halide ensures that the tellurium oxide bonds are not broken and that the glass is not otherwise weakened by the presence of a large concentration of halide. In an embodiment, the halide 28 is Fluoride. Fluoride provides the most effective drying of any of the halides.

In an embodiment, the oxide glass is lead free.

In an embodiment, the oxide glass is a passive glass free of any active dopants.

In an embodiment, the active glass includes active dopants selected from Erbium (Er), Holmium (Ho), Thulium (Tm), Dysprosium (Dy), Samarium (Sm), Iron (Fe) and Chromium (Cr) for stimulated emission at a wavelength between 2 microns to 4.5 microns. The oxide glass exhibits solubility to support high concentrations of active dopants up to and exceeding 2.5 and even 5 weight percent. In other embodiments, lower dopant concentrations may be used.

FIG. 3 plots the absorption coefficient versus wavelength for three different glasses Tellurium Tungsten 30, Tellurium Tungsten w/OH— reduction 32 and TeLaZnO w/OH— reduction 34 illustrating first the improvement in optical performance of effective OH— reduction and then elimination of any passive constituents whose inherent absorption wavelength is shorter than that of Tellurium (IV) oxide. The absorption coefficient is a measure of the ratio of transmitted power to incident power. Tungsten is a standard glass former for Tellurium (IV) Oxide that is well known to form strong, stable and chemically durable glasses. However, as shown in FIG. 1 Tungsten has an inherent absorption wavelength shorter than that of Tellurium (IV) Oxide.

As shown, the Tellurium Tungsten glass 30 starts showing some absorption around 2.7 microns that becomes significant at about 3.0 microns. This is due to the absorption features of hydroxyl (OH—). The Tellurium Tungsten glass w/OH— reduction 32 starts showing some absorption around 3.0 microns that becomes significant at about 3.7 microns. The effective reduction of OH— (without breaking the $TeO_2$ bonds) does significantly extend the bandwidth over which the absorption coefficient remains low. However, the presence of Tungsten (W) introduces absorbers at 2.7 microns and 3.6 microns due to the $4^{th}$ and $3^{rd}$ phonon energies, respectively. These higher order terms result in significant absorption. The TeLaZnO w/OH— reduction glass 34 starts showing some absorption around 4.0 microns that becomes significant at about 4.4 microns, thus extending the low loss bandwidth well into the MIR. Because of the "log" scale, these changes in the absorption coefficient are dramatic and have significant effects on loss in passive fibers having lengths in the meters to tens of meters and concentration-quenching in active fibers.

In an embodiment, the oxide glass has an optical loss of less than 2 dB/m over the entire spectral range from 0.6 microns to 4.5 microns. The glass exhibits an optical loss of less than 0.5 dB/m over a spectral sub-band from 0.65 to 4.2 microns. The glass exhibits an optical loss of less than 0.3 dB/m over a sub-band from 2 microns to 4 microns including an optical loss of less than 0.3 dB/m due to OH— at approximately 3 microns corresponding to the peak absorption of OH—.

Figure 4:
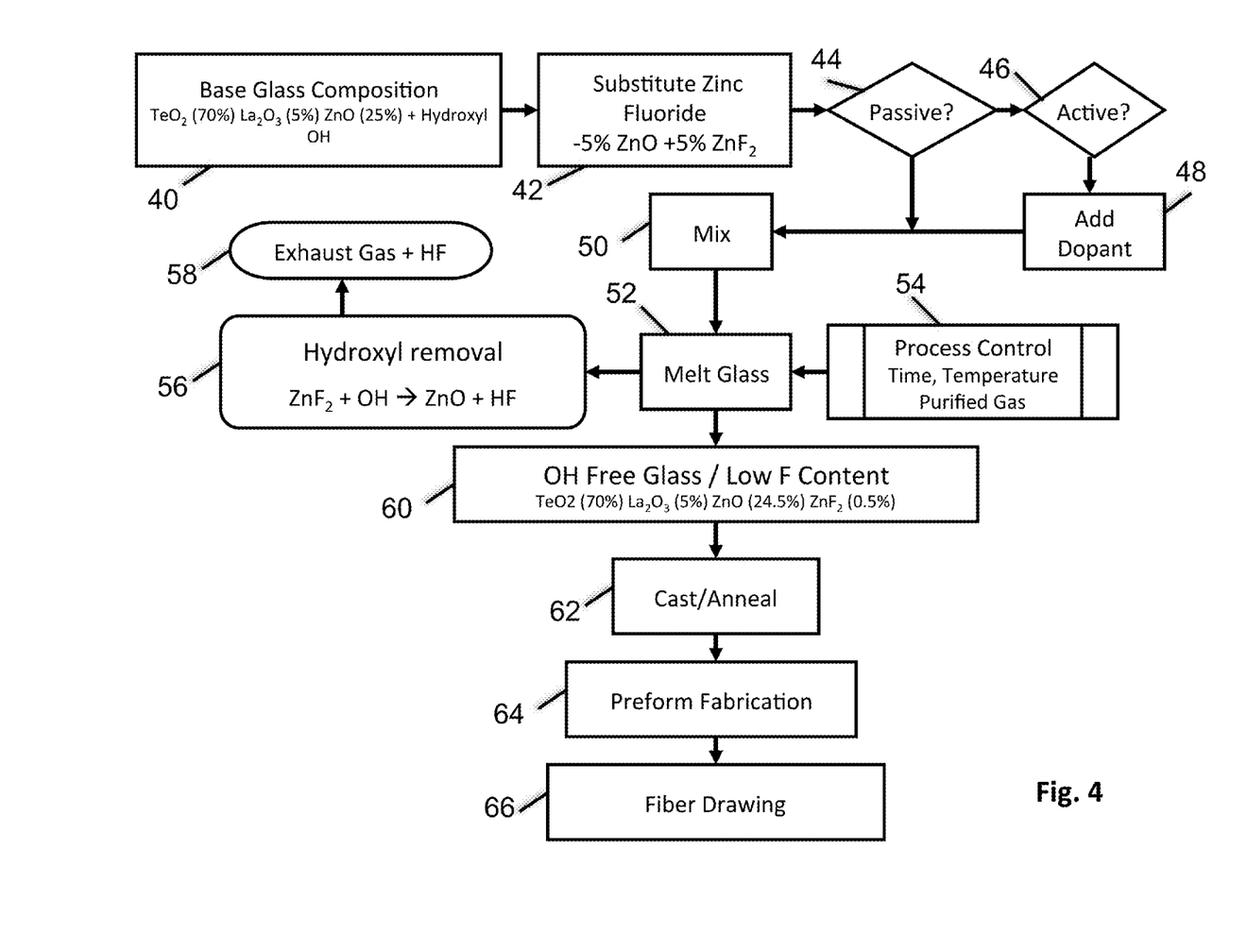
FIG. 4 is a process diagram for an embodiment of forming a bulk tellurium oxide glass and then drawing a fiber.

An embodiment of a process for making a bulk finished glass and using a rod-in-tube technique to draw fiber from the finished glass is described in FIG. 4. A base glass composition is defined (step 40). In this example, the base glass composition includes $TeO_2$ (70%), $La_2O_3$ (5%) and ZnO (25%). Hydroxyl (OH—) is present as an impurity in the constituent powders, typically at a level of a fraction of a percent. Next a certain percentage, here 5%, of the ZnO is substituted with a halide, here $ZnF_2$, (step 42) that acts as the drying agent to remove the OH— during the melt. In general, the percentage of $ZnF_2$ is preferably selected such that the finished glass includes a small non-zero residual amount of the Fluoride, enough to ensure that the drying process was not starved of Fluoride and not so much as to break Tellurium Oxide bonds or to otherwise weaken the glass. In different embodiments, the halide might be as low as 0.2% and as high as 7% in the initial glass. If the glass is to be a passive glass (step 44) the formulation is complete. However, if the glass is to be an active glass (step 46), dopant is added (step 48). By convention rare earth dopant is typically substituted for a certain percentage of the Lanthanum Oxide due to their physical and electronic similarity. Because the process is so effective at removing OH— and thereby avoiding concentration-quenching, relatively very high dopant percentages can be supported. Dopant concentrations up to and exceeding 2.5 and even 5 weight percent have been demonstrated. Dopant concentrations in other known tellurite glasses typically cannot exceed 2 wt % due to concentration-quenching from residual hydroxyl.

Once the glass formulation is set, the oxides and halides are provided, typically in the form of powders, mixed (step 50) and melted (step 52). The time, temperature and purified gas atmosphere for the glass melt are controlled (step 54). In an embodiment, the mixed powders are melted in a gold crucible in a furnace at approximately 750-950 degrees C. The atmosphere surrounding the crucible may be controlled to consist of dry inert gas, oxygen or mixtures of inert gas and oxygen. The materials within the crucible are maintained in a liquid state for sufficient time to obtain a homogenous melt. Melts can be mechanically stirred or bubbled with flowing gas to aid in homogenization and/or drying.

During the melting and mixing process the fluoride present in the melt will chemically react with residual hydrogen present in the melt (step 56). The fluoride chemical byproducts HF are purged in the exhaust gas (step 58) leaving the glass with no or a minimum amount of hydrogen. Some or all of the initially present zinc fluoride is converted to zinc oxide and the resultant glass has a lower concentration of zinc fluoride than was present in the starting materials. It is desirable to minimize the zinc fluoride concentration in the glass, since the zinc fluoride reduces the glass transition temperature and makes the glass less mechanically robust. In this example, the finished glass composition includes $TeO_2$ (70%), $La_2O_3$ (5%), ZnO (24.5%) and $ZnF_2$ (0.5%) (step 60).

Glasses obtained may be cast into preheated molds and slowly cooled (annealed) to room temperature in order to relieve stresses (step 62). The mechanical robustness of the resultant glass allows casting of ingots of arbitrary size and shape. An ingot size of approximately 1"×1×5" is sufficiently large to be used in the fabrication of bulk optical components or preforms suitable for drawing optical fiber.

Alternative methods may be used to form a glass, such as the sol-gel method. An optical fiber can be fabricated from the tellurite glass. Optical fiber fabricated from the tellurite glass can preserve the glass intrinsic material transmission if the fiber is properly drawn. One method to form optical fiber is the rod-in-tube method. The preform consists of an inner rod surrounded by an outer tube. These shapes may be readily fabricated (step 64) from the glass ingot by conventional glass fabrication techniques, such as mechanical cutting, grinding, and polishing. An important property of the glass is its resistance to chipping and fracturing, which enables fabrication of the preforms. The preform is made by placing a rod with polished outer surfaces inside a tube with polished inner and outer surfaces. The inner rod forms the fiber core and the outer tube forms the fiber cladding. The refractive index of the core and clad glasses can be manipulated by changing the ratio of glass constituents such that any value of numerical aperture from 0 to greater than 0.4 can be obtained. One method to change the refractive index is to vary the $TeO_2$ to ZnO ratio while leaving the $La_2O_3$ level approximately constant. Optical, thermal and mechanical properties of the base glass can similarly be adjusted by manipulation of constituent ratios or by the addition of other constituents that have no unwanted absorptions, such as those listed previously.

To draw the fiber (step 66), the preform can then be placed into a furnace with a controlled atmosphere. The controlled atmosphere may be an inert gas such as nitrogen, argon or helium, or an atmosphere of oxygen or a combination of gases. The preform may then be heated to a temperature sufficient to soften the glass, causing the core rod and surrounding tube to fuse together with or without the aid of vacuum. The preform pulling temperature is above the glass transition temperature of approximately 300 C. The softened and fused glass is subsequently pulled and drawn into fiber. Care must be taken during the drawing to avoid recrystallization, which can result in the formation of scattering sites at grain boundaries. A protective coating may be applied to the outer cladding surface and the fiber spooled for convenient storage and transport. The protective coating may be a polymer, metal, carbon, or other coating material. The protective coating helps to preserve the intrinsic strength of the tellurite glass fiber. Fibers drawn from the telluride glass have demonstrated a tensile strength exceeding 50 KPSI. This high tensile strength facilitates forming a mechanically robust fiber that can be readily handled, spooled, and routed through bulkheads without breakage.

Many types of fiber structures may be made in addition to the basic single core/single clad geometry. For example, a double clad fiber may be made by using two tubes surrounding the core. A fiber with multiple cores may be made. The fiber may include a photonic crystal structure consisting on an array of holes within the fiber. The fiber core may be designed to support either single mode or multimode operation. For single mode operation the core dimensions are typically small, no more than several times the wavelength of the light being transmitted. For a multimode fiber, the core dimensions are typically many times larger than the wavelength of the transmitted light. A fiber core diameter of 100 microns may be used although larger and smaller cores may be used depending on the application.

Alternative methods of fabricating a fiber may be used in addition to the rod-in-tube method described above. Preforms may be fabricated by vapor deposition of material on the inner surface of a polished tube. Alternatively, glass in molten form may fill the cavity of a tube. The molten glass may then be cooled and the resultant assembly used as a preform. Instead of forming the tube by mechanical methods, a tube may be formed by cooling and solidifying the outer surfaces of a glass ingot and allowing the inner molten regions to drain away.

Figure 5A:
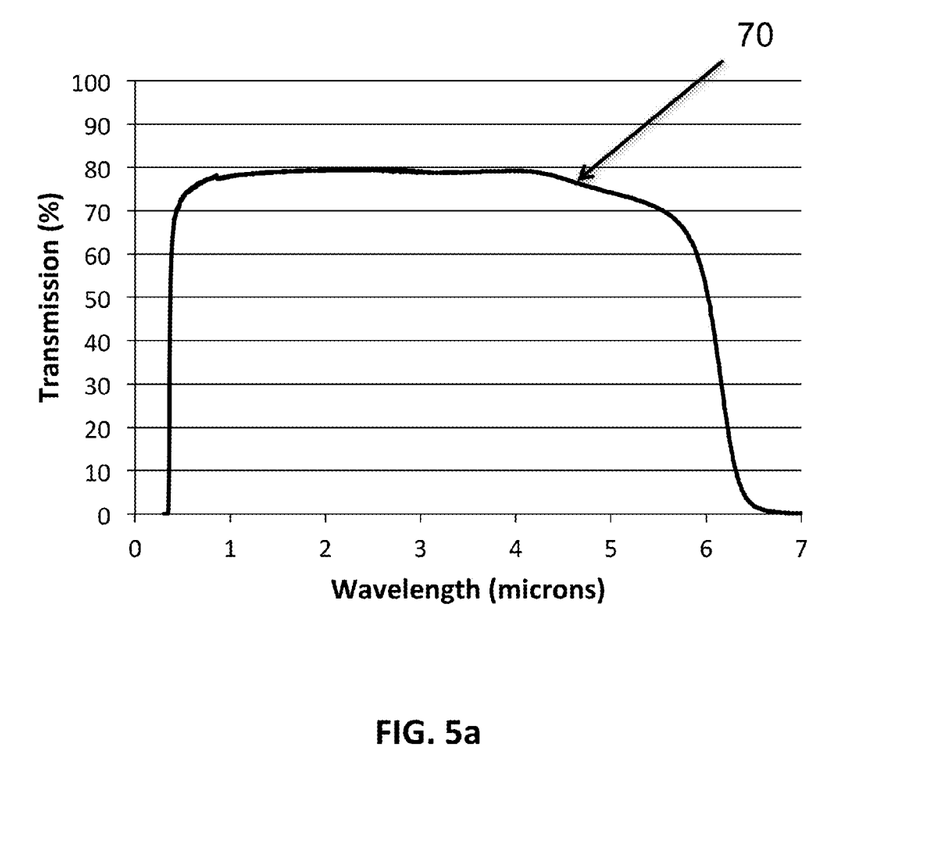
FIGS. 5a and 5b are plots of transmission and propagation loss, respectively versus wavelength for a fiber having a core tellurium oxide glass composition in accordance with the present invention.
Figure 5B:
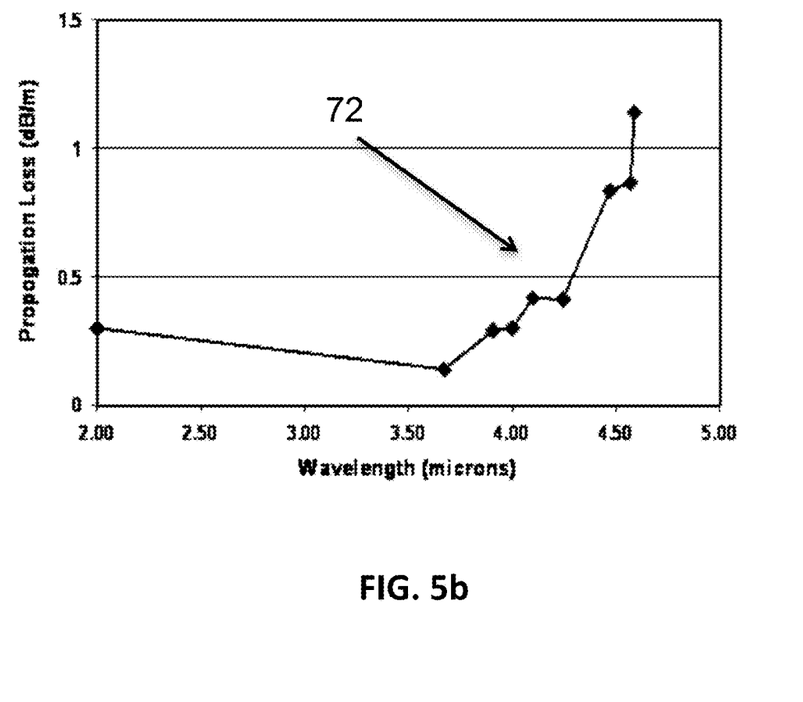

FIGS. 5*a* and 5*b* show the transmission and propagation loss versus wavelength for an exemplary tellurite glass. In this example, the finished glass formulation comprises $TeO_2$ (70%), $La_2O_3$ (5%), ZnO (24.5%) and $ZnF_2$ (0.5%). The bulk glass and fiber were formed using the processes described above.

FIG. 5*a* shows the transmission spectrum 70 of a 1.5 mm thick tellurite glass sample prior to fiber draw. The measurement includes the Fresnel reflective losses, so the maximum transmission value is only about 80%. In a broad spectral region from approximately 600 nm to 4000 nm the glass has very low absorption losses. In the short wavelength region the glass maintains some level transmission well into the UV. For example, the sample transmission does not drop to 5% until 353 nm. In the long wavelength region the glass maintains some level of transmission well into the mid-infrared. The absorption is negligible until approximately 4000 nm. The region from approximately 4000 nm to 5500 nm shows a gradual transmission drop. Above 5500 nm the transmission roll off is steeper, but the sample transmission does not drop to 5% until 6380 nm. While in some applications the glass may be useful at shorter or longer wavelengths, most applications for the glass will be in the wavelength range of approximately 350 nm to 6400 nm. For applications that require high transmittance or long propagation lengths in the glass, the useful operating range is narrower approximately 600 nm to 4500 nm. The spectral region outside this low loss band may be useful where transmittances can be low or propagation lengths short or moderate.

FIG. 5b illustrates that low loss optical fiber can be drawn from the tellurite glass. The fiber used in this measurement had a core diameter of 70 microns and a cladding outer diameter of 170 microns. The propagation loss 72 is less than 0.5 dB/m for IR wavelengths shorter than approximately 4 microns. Since the thin sample transmission measurements show no absorption features across the near IR region, the fiber drawn from the glass maintains continuous high transmission over this entire spectral region. Propagation loss begins to rise for wavelengths longer than approximately 4 microns, consistent with the thin sample transmission measurements shown in FIG. 5a. However, the propagation loss is still less than 1.5 dB/m for wavelengths longer than 4.5 microns. Fiber with propagation losses much higher than 1.5 dB/m is still useful in applications where the fiber lengths are short or high transmission is not a requirement.

By way of comparison, Berger claims a "surprisingly low" absorption of 3.5 dB/cm (350 dB/m) at 3.2 microns. Ebendorff reported an OH absorption peak of 40-50 dB/m at 3.3 microns. Our glass has an optical loss of 0.5 dB/m at the same wavelength. Liao and Massera report their data as absorption coefficient as a function of wavenumber preventing a direct comparison. However, FIG. 3 of Liao and FIG. 3a of Massera clearly show significant absorption features between 2.5 and 3 microns. As a result both glasses will have much higher absorption in the MIR band than ours. Massera FIG. 4 shows results for fiber with ~10 dB/m loss (10% transmitted light in 1 meter) at 1310 nm. By comparison, our glass exhibits <0.3 dB/m (93% transmitted) at 1310 nm. Massera does not show loss at 3 micron where hydroxyl has its peak absorption. But his fiber transmits only 1% of the light at 2 meters, which is useless in many applications, whereas our fiber transmits 86% of the light.

The glass and fiber described here are useful in a variety of applications, such as a simple transport fiber with a broad transmission range, a source for the generation of broadband supercontinuum light, an amplifier or a laser. As a transport fiber, where the fiber guides light originating at a first location to a second location remote from the first location, the invention can be used in spectroscopy, chemical sensing, medical applications, military infrared countermeasures and guiding laser-generated light. The ability to transmit light in the ultraviolet, visible and mid infrared regions simultaneously is a key advantage. For active devices, the fiber includes an active constituent for light generation at a wavelength in the MIR band between 2-4.5 microns and a source (e.g. a pump and signal) to properly energize the active constituent. "Active constituent" could be rare-earth or metal dopants (for lasers and amplifiers), or Raman activity in core glass (for Raman amplifier/laser), or nonlinear (self phase modulation, n2, Raman) activity in core glass (for SC generation). In a laser, the pump signal is absorbed and generates stimulated emission for lasing action in the fiber. In an amplifier, the pump generates gain for signal light propagating through the active fiber. In a supercontinuum source, the pump generates the supercontinuum light in the fiber by a nonlinear mechanism.

Figure 6:
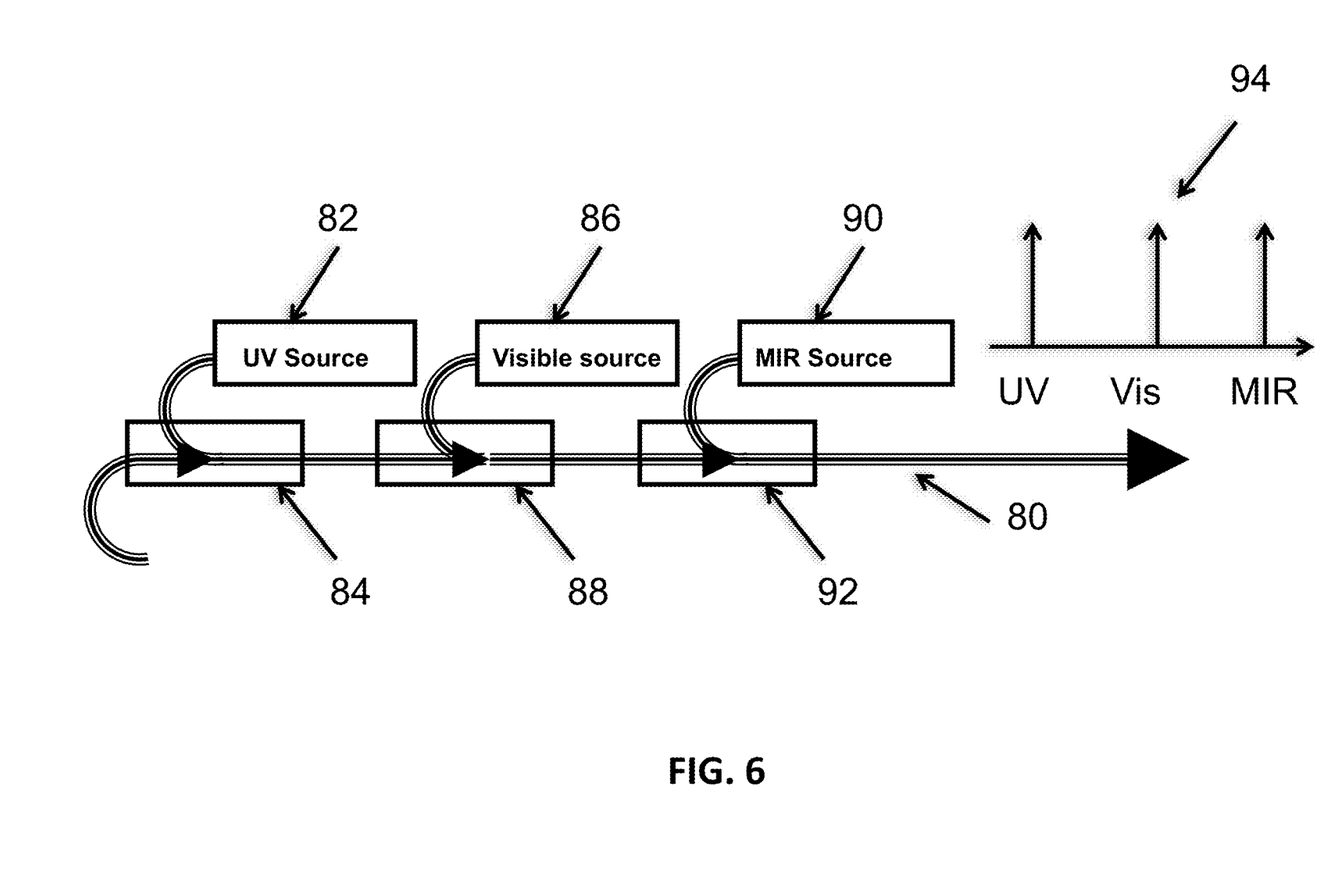
FIG. 6 is a diagram of a system illustrating the use of a passive tellurium-oxide fiber to transport optical signals for sources spanning UV-Vis-MIR.

Referring now to FIG. 6, a passive fiber 80 formed from the Te/La/ZnO glass is used to transport light spanning the UV, Visible and MIR bands with an optical loss of less than 1.5 dB/m. A UV source 82 generates UV light that is coupled into passive fiber 80 via an optical combiner 84. A visible source 86 generates visible light that is coupled into passive fiber 80 via an optical combiner 88. A MIR source 90 generates UV light that is coupled into passive fiber 80 via an optical combiner 92. The sources may be active simultaneously in which case they generate a combined UV/Vis/MIR output 94 from passive fiber 80. Alternately, passive fiber 80 may form a transport network to selectively transport one or more of the different sources at one time to another location. In either case, low optical loss from the UV to approximately 4.5 microns in the MIR is desired.

In alternate embodiments, the passive fiber 80 may be used with only a single wavelength source or a plurality of optical sources over any spectral region within the fiber transmission band. In some applications, the energy of one propagating wavelength may be used to generate a different propagating wavelength. An example of such an application is in chemical sensing where a visible wavelength signal may propagate to the distal end of a fiber where it causes emission of a MIR wavelength, which in turn is propagated back through the fiber where it may be detected.

Figure 7:
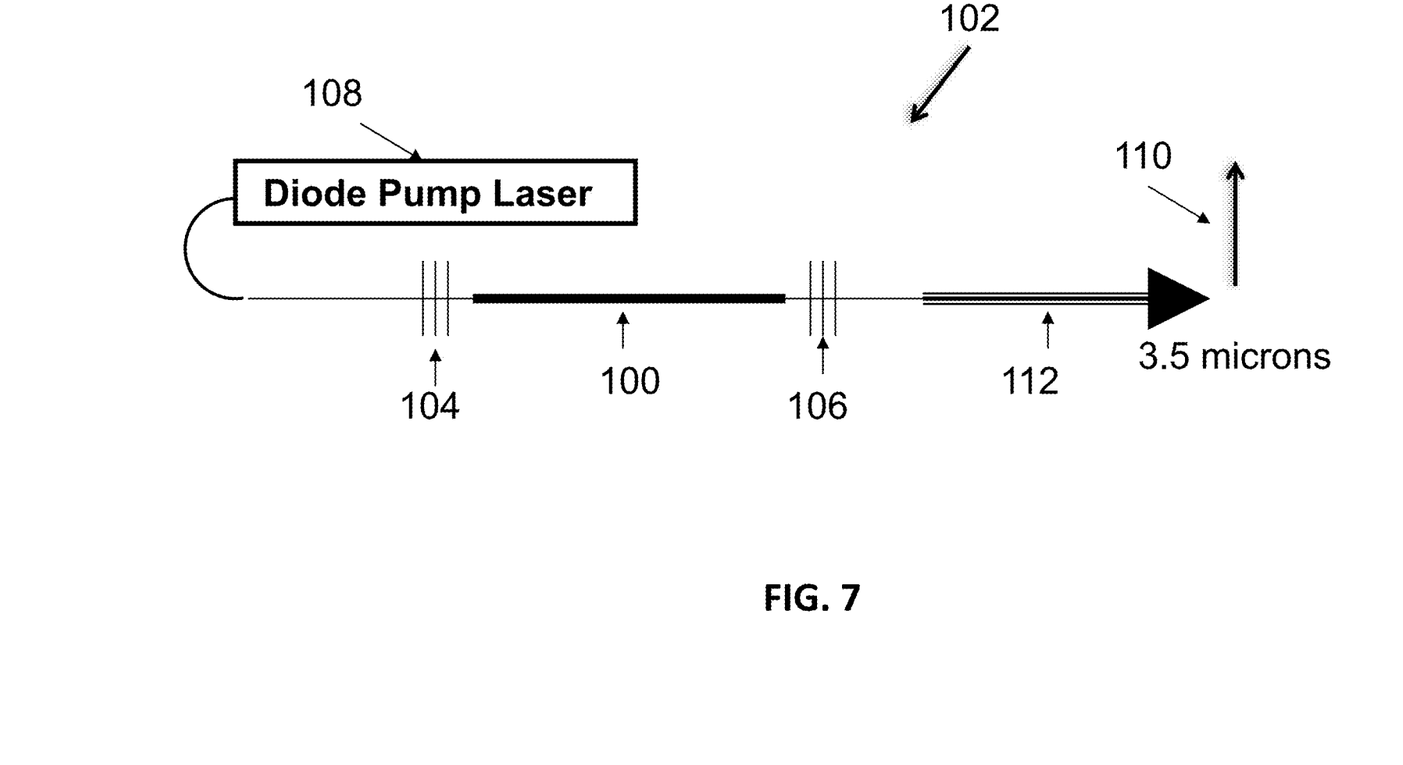
FIG. 7 is a diagram of a MIR laser source using an active tellurium oxide fiber as the gain media.

Referring now to FIG. 7, an active fiber 100 formed from the Te/La/ZnO glass and doped with Erbium provides the gain media for a MIR laser 102. Alternately, the Te/La/ZnO glass may be doped with other dopants to provide lasers in other bands, or un-doped in the case of a Raman-based laser. MIR laser 102 includes a pair of fiber gratings 104 and 106 which provide optical feedback on opposite sides of active fiber 100 to form a resonate cavity. A resonant cavity may alternatively be formed by using the mirror-like end face of an optical fiber having the appropriate reflectivity in place of one or both of the gratings. A diode pump laser 108 provides a pump signal that is coupled into the resonant cavity to stimulate emission of the dopant to produce a narrowband laser output 110 through a passive fiber 112, suitably formed of the same Te/La/ZnO glass.

Supercontinuum generation is based on optical nonlinearities excited by illumination of a sample with optical pulses having high peak power. The high peak power of the optical pulse mixes with itself via self phase modulation, Raman conversion, four wave mixing, and other nonlinear effects, transforming the initially narrow spectral output of the laser source into a broad spectrum. Optical fiber is a particularly useful structure for generating supercontinuum emission, since all the generated optical fields remain guided by the fiber, significantly reducing the power required to efficiently generate the supercontinuum. The required power level for efficient supercontinuum generation is proportional to the $\chi^3$ nonlinear coefficients, which drives the spectral broadening. The tellurite glass fiber described herein has a nonlinear coefficient 40 to 60 times greater than that of silica glass fiber. This allows the supercontinuum to be generated with lower power optical pulses. Alternatively, efficient generation may be obtained with equal optical powers and a shorter interaction length. For tellurite glass fibers efficient supercontinuum emission can be generated with fiber lengths shorter than 10 cm. In some cases the fiber length may be less than 5 cm. The width of the supercontinuum spectra is limited by the transparency window of the fiber where the supercontinuum is generated. For conventional silica fiber the spectra can extend continuously from about 2300 nm to 370 nm, the transmission window of the silica fiber. The tellurite glass fiber can advantageously have much broader spectral output, since the fiber is capable of transmitting light in the ultraviolet, visible and mid infrared regions simultaneously. The fiber may generate a supercontinuum extending from approximately 370 to 6000 nm.

In an embodiment, a tellurite glass fiber is used to generate a broadband supercontinuum spectrum. The output radiation is confined to an output fiber, which delivers the radiation to a fiber splitter. The output of the splitter is a plurality of transport fibers that direct the supercontinuum light to various points. All the fiber and components illustrated in the fiber may be based on tellurite glass. This architecture allows a single laser source to deliver broad-spectrum radiation at multiple points. The laser source and delivery system are constructed entirely from fiber and fused fiber connections, eliminating the possibility of mechanical misalignment. In other embodiments, the supercontinuum source may be coupled to a single transport fiber.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An oxide glass composition, comprising: a glass network former of Tellurium (IV) oxide TeO2 of 65 to 90 mole percent, said Tellurium (IV) oxide having an absorption feature with an inherent absorption wavelength corresponding to its phonon energy peak; a glass intermediate of Lanthanum (III) oxide La2O3 of 0.2 to 15 mole percent, said Lanthanum (III) oxide having an absorption feature with an inherent absorption wavelength longer than that of Tellurium (IV) oxide; and a glass modifier MO of 0.2 to 35 mole percent where M is selected from Mg, Ca, Sr, Ba, Zn, Pb and Cd, said modifier having an absorption feature with an inherent absorption wavelength longer than that of Tellurium (IV) oxide; a non-zero amount of halide of less than 0.5 mole percent, said halide having an absorption feature with an inherent absorption wavelength longer than that of Tellurium (IV) oxide; and wherein said oxide glass composition is substantially free comprising less than 0.1 mole percent of each of the following,
Sodium Oxide Na2O;
Hydroxide OH—; and
any other passive glass constituent having an absorption feature with an inherent absorption wavelength shorter than that of Tellurium (IV) oxide, wherein said glass exhibits an optical loss of less than 2 dB/m from 0.6 microns to 4.5 microns.

2. The oxide glass composition of claim 1, wherein
the Lanthanum (III) oxide concentration is at least 5 mole percent;
the halide comprises a non-zero amount of Fluoride less than 0.5 mole percent, and
the modifier MO comprises ZnO.

3. The oxide glass composition of claim 1, wherein the Lanthanum (III) oxide is 5 to 10 mole percent.

4. The oxide glass composition of claim 1, wherein the glass composition is a passive glass free of any active dopants.

5. The oxide glass composition of claim 1, wherein the glass composition comprises an active dopant selected from Er, Ho, Tm, Dy, Sm, Fe and Cr for stimulated emission at a wavelength between 2 microns to 4.5 microns.

6. The oxide glass composition of claim 5, wherein the active dopant is at least 2.5 weight percent.

7. The oxide glass composition of claim 1, wherein said oxide glass exhibits an optical loss of less than 0.5 dB/m over a spectral sub-range from 0.65 microns to 4.2 microns.

8. The oxide glass composition of claim 7, wherein said oxide glass exhibits an optical loss of less than 0.3 dB/m over a spectral sub-range from 2 microns to 4 microns.

9. The oxide glass composition of claim 1, wherein said oxide glass exhibits an optical loss of less than 0.3 dB/m due to OH— at approximately 3 microns corresponding to the peak absorption for OH—.

10. The oxide glass composition of claim 1, wherein said oxide glass exhibits a tensile strength exceeding 50 KPSI.

11. The oxide glass composition of claim 1, wherein said oxide glass exhibits a $\Delta T = Tx - Tg$ of at least 100 C. where Tx is the crystallization temperature of the glass and Tg is the glass transition temperature.

12. The oxide glass composition of claim 1, wherein the glass is in the form of an optical fiber.

13. The oxide glass composition of claim 1, wherein the glass composition comprises an active dopant selected from Ce, Pr, Eu, Tb, Lu, Bi, Ti, Er and Yb may be used for stimulated emission at wavelengths less than 2 microns.

14. An oxide glass composition, comprising:
a glass network former of Tellurium (IV) oxide TeO2 of 65 to 90 mole percent, said Tellurium (IV) oxide having an absorption feature with an inherent absorption wavelength corresponding to its phonon energy peak; a glass intermediate of Lanthanum (III) oxide La2O3 of 5 to 15 mole percent, said Lanthanum (III) oxide having an absorption feature with an inherent absorption wavelength longer than that of Tellurium (IV) oxide; and a glass modifier MO of 0.2 to 35 mole percent where M is selected from Mg and Zn, said modifier having an absorption feature with an inherent absorption wavelength longer than that of Tellurium (IV) oxide; non-zero amount of fluoride up to 0.5 mole percent, said fluoride having an absorption feature with an inherent absorption wavelength longer than that of Tellurium (IV) oxide; and wherein said oxide glass composition is substantially free comprising less than 0.1 mole percent of each of the following,
Sodium Oxide Na2O;
Hydroxide OH—; and
any other passive glass constituent having an absorption feature with an inherent absorption wavelength shorter than that of Tellurium (IV) oxide; wherein said oxide glass exhibits an optical loss of less than 2 dB/m over the entire spectral range from 0.6 microns to 4.5 microns and less than 0.5 dB over a spectral range of 2 microns to 4 microns; wherein said oxide glass exhibits a tensile strength of at least 50 KPSI; and wherein said oxide glass exhibits a $\Delta T = Tx - Tg$ of at least 100 C. where Tx is the crystallization temperature of the glass and Tg is the glass transition temperature.

15. A method for forming an oxide glass, comprising:
providing a mixture of powdered oxides comprising, a glass network former of Tellurium (IV) oxide TeO2 of 65 to 90 mole percent, said Tellurium (IV) oxide having an absorption feature with an inherent absorption wavelength corresponding to its phonon energy peak; a glass intermediate of Lanthanum (III) oxide La2O3 of 0.2 to 15 mole percent, said Lanthanum (III) oxide having an absorption feature with an inherent absorption wavelength longer than that of Tellurium (IV) oxide; and a glass modifier MO of 0.2 to 35 mole percent where M is selected from Mg, Ca, Sr, Ba, Zn, Pb and Cd, said modifier having an absorption feature with an inherent absorption wavelength longer than that of Tellurium (IV) oxide; and a halide of 0.2 to 7 mole percent, any said halide having an absorption feature with an inherent absorption wavelength longer than that of Tellurium (IV) oxide, said mixture comprising a non-zero amount of a hydroxyl (OH—) impurity; applying heat to the mixture of powdered oxides in a gas atmosphere to melt the powdered oxides to form an oxide glass, said halide reacting with the hydroxyl to remove the hydrogen during the melt; and annealing the oxide glass to form the finished oxide glass that comprises a non-zero amount of said halide less than 0.5 mole percent, said finished oxide glass substantially free comprising less than 0.1 mole percent of each of the following,
Sodium Oxide Na2O;
Hydroxide OH—; and
any other passive glass constituent having an absorption feature with an inherent absorption wavelength shorter than that of Tellurium (IV) oxide, wherein said glass exhibits an optical loss of less than 2 dB/m from 0.6 microns to 4.5 microns.

16. The method of claim 15, wherein the glass modifier MO comprises ZnO and the halide comprises Zinc Fluoride, the reaction of Zinc Fluoride with the hydroxyl removing hydrogen fluoride and producing an additional amount of ZnO.

17. The method of claim 15, wherein the Lanthanum (III) oxide concentration is at least 5 mole percent.

18. The method of claim 15, wherein the finished oxide glass exhibits an optical loss of less than 0.5 dB/m over a spectral range of 2 microns to 4 microns.

19. The method of claim 15, further comprising:
adding an active dopant of at least 2.5 weight percent to the glass composition, said active dopant selected from Er, Ho, Tm, Dy, Sm, Fe and Cr for stimulated emission at a wavelength between 2 microns to 4.5 microns.

20. An optical device, comprising:
a passive fiber configured to transport optical energy with an optical loss of less than 2 dB/m over a spectral range from 0.6 microns to 4.5 microns and less than 0.5 dB/m over a spectral range of 2 microns to 4 microns, a transmissive core of said fiber comprising an oxide glass with a glass network former of Tellurium (IV) oxide TeO2 of 65 to 90 mole percent, a glass intermediate of Lanthanum (III) oxide La2O3 of 0.2 to 15 mole percent, a glass modifier MO of 0.2 to 35 mole percent where M is selected from Mg, Ca, Sr, Ba, Zn, Pb and Cd and a non-zero amount of halide less than 0.5 mole percent, said oxide glass substantially free comprising less than 0.1 mole percent of Sodium Oxide Na2O, Hydroxide OH— and any other passive glass constituent having an absorption feature with an inherent absorption wavelength shorter than that of Tellurium (IV) oxide; a source of optical energy in the Mid IR band between 2 and 4.5 microns optically coupled to the passive fiber; and a source of optical energy in the UV or Visible bands optically coupled to the passive fiber.

21. An optical device, comprising:
an active fiber comprising an active core formed of an oxide glass with a glass network former of Tellurium (IV) oxide TeO2 of 65 to 90 mole percent, a glass intermediate of Lanthanum (III) oxide La2O3 of 0.2 to 15 mole percent, a glass modifier MO of 0.2 to 35 mole percent where M is selected from Mg, Ca, Sr, Ba, Zn, Pb and Cd, a non-zero amount of halide less than 0.5 mole percent and an active constituent, said oxide glass substantially free comprising less than 0.1 mole percent of Sodium Oxide Na2O, Hydroxide OH— and any other passive glass constituent having an absorption feature with an inherent absorption wavelength shorter than that of Tellurium (IV) oxide, said oxide glass exhibiting an optical loss of less than 2 dB/m from 0.6 microns to 4.5 microns; and an energizing source coupled to the active fiber to energize the active constituent to generate light at a wavelength in the Mid IR band between 2 microns and 4.5 microns.

22. The optical device of claim 21, wherein the amount of the active constituent is at least 2.5 weight percent.

* * * * *